Patented June 7, 1938

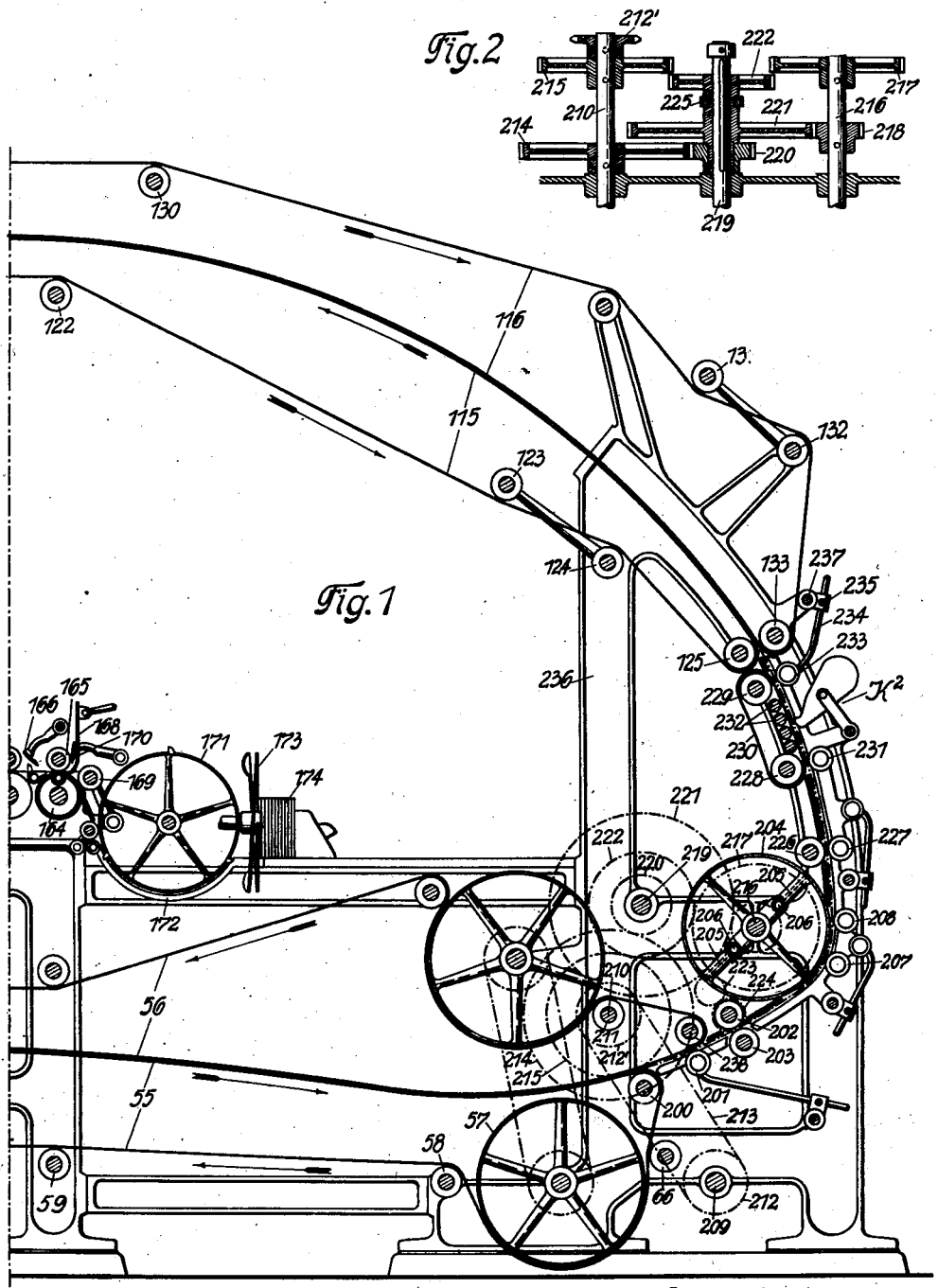

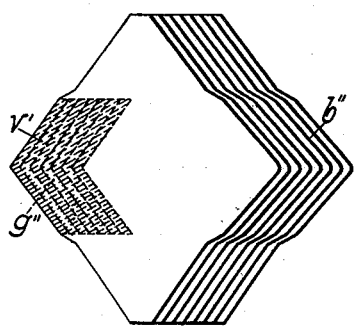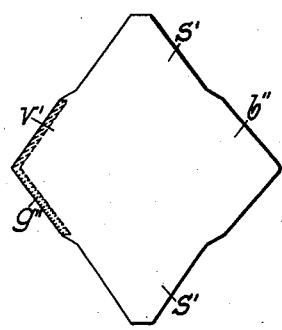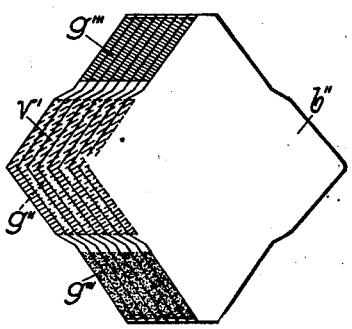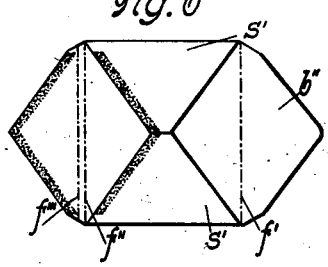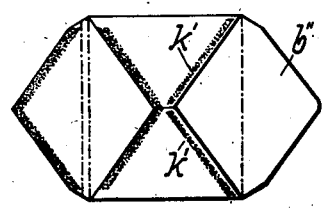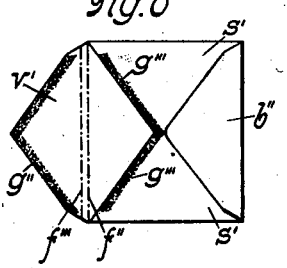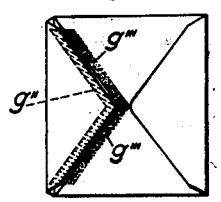

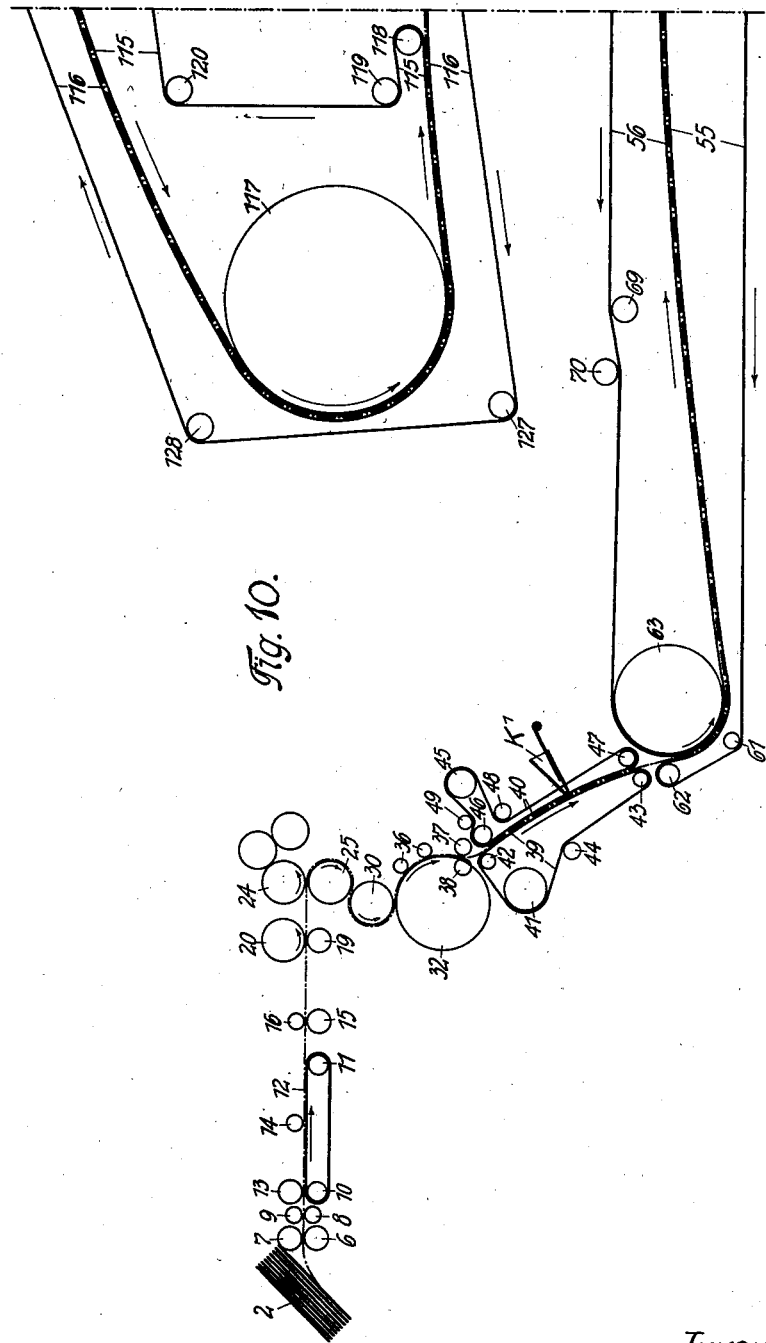

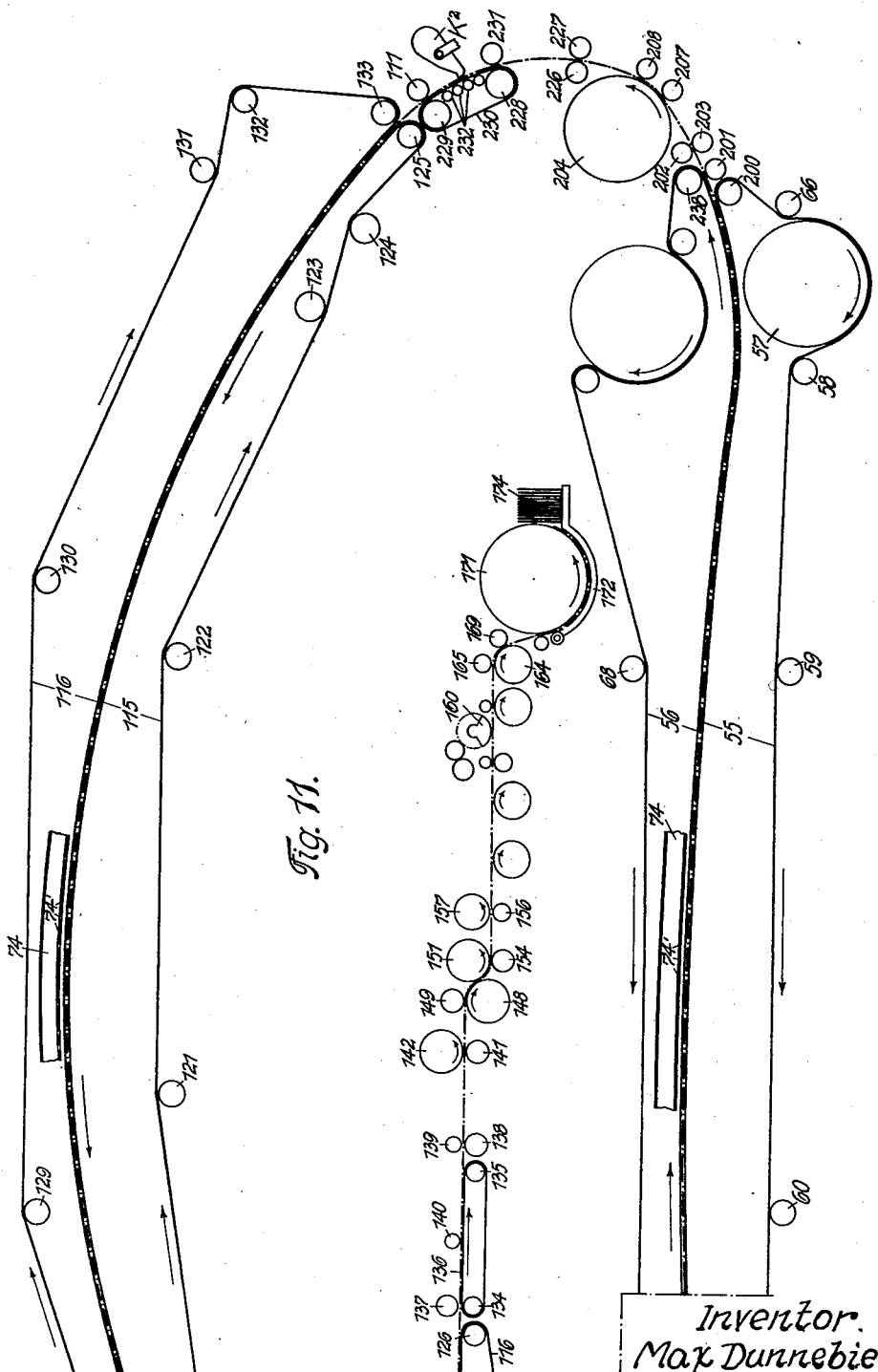

2,119,951

UNITED STATES PATENT OFFICE 2,119,951

PROCESS AND APPARATUS FOR THE MANUFACTURE OF ENVELOPES, BAGS, AND SIMILAR ARTICLES

Max Dünnebier, Neuwied, Germany

Application February 19, 1937, Serial No. 126,689
In Germany February 20, 1936

10 Claims. (Cl. 93—62)

This invention relates to a process and apparatus for the manufacture, in one continuous operation, of envelopes, bags and similar articles from shaped blanks or sheets which require an adhesive application on both sides for the subsequent closing or sealing of the finished article. More particularly, the process and apparatus according to the present invention are intended for the production of articles of the above type which are adapted for so-called "auto-adhesion", "dry-gumming", or "self-sealing", having two coatings of the so-called "dry adhesive", so that the sealing of the envelopes and other articles is effected by simply pressing the two adhesive coatings against each other without previously moistening the same.

The specification of the prior United States Patent No. 2,019,946 describes a process and apparatus which serve the above purpose and render it possible to manufacture in one continuous operation envelopes or other articles adapted for auto-adhesion, by proceeding from the shaped blank. In accordance with the prior patent, however, it is essential that blanks from which the envelopes or bags are made are so shaped that the adhesive coatings for auto-adhesion, which are distributed throughout its two side surfaces, extend along two edges which lie opposite each other in opposite directions of space and which run parallel to each other. They must in this manner permit one and the same stepped arrangement of the shaped blanks with the two adhesive-receiving edge surfaces of the blanks uncovered. In accordance with the disclosure of the above patent it is not possible to manufacture envelopes and other similar articles in which one of the two adhesive coatings for auto-adhesion is located on the edge of the closing flap and the other one on the edges of two folded side flaps which are turned towards the closing flap and in their inverted or folded condition partly overlap each other. In this category belong the much-used envelopes of the so-called "pointed closure" shape and the kind of flat bags most commonly used. On the shaped blanks from which articles of this kind are made, the two adhesive coatings for auto-adhesion are applied upon the two side surfaces, but they cannot be arranged along edges which lie opposite each other in different directions of space. The adhesive coatings on the other hand are located on shaped blank edges which lie in the same direction of space and do not always run parallel. If therefore the blanks are stepped in such a way that the edge surfaces which are to receive the adhesive coatings for the closing flap, lie uncovered, the edges of the two side flaps which must receive the other adhesive coating are covered and therefore inaccessible for the application of the adhesive. The stepped arrangement of the shaped blanks which is suitable for the application of the first adhesive coating, cannot be retained for the application of the second coating, as is necessary when using the apparatus according to the above patent. On the contrary, after the first adhesive application the blanks must be re-stepped before being fed to the second adhesive application device, in such a way that the blank edges to receive the second coating will then lie uncovered and be accessible to the second adhesive applying device.

One object of this invention is to provide an improved process and apparatus wherein the blanks are fed in stepped form for the application of the first adhesive coating and are then re-stepped for the application of the second coating.

Another object of the present invention is to provide a process and apparatus being a development and improvement in the process and apparatus of the said Patent No. 2,019,946, and adapted to render it possible to make selectively both envelopes, bags and similar articles of both the above mentioned kinds in a continuous operation, proceeding from the shaped blank.

A further object of the present invention is to provide a process in which the shaped blanks have two edge surfaces that receive the adhesive coatings and lie in opposite directions of space and are fed, with continuous conveying movement and constant conveying direction, successively in the same stepped arrangement to two adhesive coating applying devices, while those blanks in which the two edge surfaces to be provided with adhesive lie in the same direction of space, are re-stepped prior to being fed to the device applying the second coating, with likewise continuous conveying movement and constant conveying direction, so that the edge surfaces receiving the second adhesive coating and previously covered up, then lie uncovered.

A still further object of this invention is to provide rollers and a suction disc operated at variable speeds according to the nature of the articles being manufactured and adapted to feed the blanks either in unchanged stepped formation to the second coating applying device or to effect a re-stepping of the blanks before the application of the said second coating without the conveying movement of the blanks being interrupted and without changing the direction of conveyance.

With these and other objects in view the invention consists in the improved process and apparatus hereinafter described, illustrated in the accompanying drawings, and particularly pointed out in the appended claims, it being understood that various changes in the constructional details of the apparatus may be made without departing from the spirit of the invention or sacrificing any of the advantages thereof.

In the drawings:

Fig. 1 is a vertical section corresponding to the right hand portion of Fig. 16 of the said Patent No. 2,019,946, and showing the portion of the apparatus having the present improvements embodied therein;

Fig. 2 is a horizontal section of the driving gear shown for greater clearness with all the axles in the same plane;

Fig. 3 shows the stepping of the blanks required during and immediately after the first adhesive application for one of the kinds of shaped blanks which require re-stepping prior to being fed to the second coating applying device;

Fig. 4 shows a single shaped blank, provided with the first adhesive coating;

Fig. 5 shows the envelope blanks of Figure 3 after their restepping;

Figs. 6 to 9 show the steps in the course of manufacture of an envelope from a shaped blank according to Fig. 5.

Figs. 10 and 11 arranged end-to-end according to the dot-and-dash lines, show a complete machine in diagrammatic form.

On the drawings the part of the apparatus shown at Fig. 1 embodies the improvements of the present invention and it should be understood that the remaining parts of the apparatus may remain exactly the same in the construction and operation as the apparatus shown in Figs. 14 and 15 and at the left-hand portion of Fig. 16 of the drawings of the said prior Patent No. 2,019,946.

Figs. 3 to 5 show blanks for the manufacture of envelopes of the so-called "pointed closure" shape, such as is represented in Fig. 8 with the closing flap open. If such envelopes are adapted for auto-adhesion, one of the adhesive coatings $g''$ is located on the edge of the closing flap $v'$, the other $g'''$ on the edges of the folded side flaps $s'$, so that when sealing the envelopes the adhesive coatings will be in contact with each other. When the two side flaps $s'$ are folded back according to Fig. 4—where the adhesive coating however has not yet been applied to the side flap edges—it is seen that here, too, as in the envelope shown in the prior Patent No. 2,019,946, the two adhesive coatings $g''$ and $g'''$ are distributed throughout the two side surfaces of the unfolded blanks, but they must be located on edges which lie in the same direction of space and not in the opposite direction as in the envelopes of the said patent. In the representation, see Fig. 3, chosen (for reasons hereinafter set forth) of the stepped arrangement of such blanks, the adhesive coating $g''$ to be applied first lies on the closing flap $v'$ at the bottom, that is to say, averted from the spectator, for which reason it is shown hatched in broken lines. Since the second adhesive coating $g'''$ must be applied to the edges of the side flaps $s'$ lying alongside of the closing flap $v'$, but on the opposite side surface of the blanks with reference to the adhesive coating $g''$, which accordingly in Fig. 3 is turned towards the spectator, it can be seen that the stepping of the blanks according to Fig. 3 is not suitable for the application of the second adhesive $g'''$ because here the respective edges of the side flaps $s'$ are covered up. Blanks of this kind are therefore, according to the process of the invention, re-stepped in such a way that in the new stepping the said edges of the side flaps $s'$ lie uncovered, as is the case in Fig. 5. In this figure the second adhesive coating $g'''$ lies on the edges of the side flaps $s'$ at the top, turned towards the spectator.

By mechanism hereinafter described in accordance with the invention the re-stepping is effected without interruption of the conveying movement of the blanks and without the direction of conveyance being changed.

In the said prior patent it is described how the stepped blanks, after they have received, if so desired, a relief embossing and an imprint of any kind, are provided with the first adhesive coating and then, for the purpose of drying this first adhesive coating, are taken over by the runs of the conveyor belt pairs 55, 56, running directly above each other and indicated only by curve lines in the drawings, which belts travel in the direction of the arrows (Fig. 1).

At the roller 200 guiding the conveyor belt pair 55, the blanks leave the conveyor belt pairs 55, 56 and now reach the device forming the subject of the present invention which renders it possible, as required, either to continue conveying the blanks unchanged in their former stepped arrangement, while being fed to the second adhesive applying device, or to restep the blanks in the above mentioned manner. For this purpose in the example according to the drawing the following arrangement is provided:

The blanks leaving the conveyor belt pair 55 at the roller 200 pass in the first place, so long as they are still in contact with the conveyor belt pair 56, between the latter and the freely running counter-rollers 201 co-operating with the conveyor belt pair and adjustable according to the size of the blanks at any time. Then the blanks are taken over by the roller pair 202, 203, which delivers them to a suction disc 204, such as is described for another purpose in Patent No. 2,019,946. The disc 204 has diametrically opposed suction openings 205 which terminate in its circumference and are connected with suction channels 206. This disc 204 is connected with its suction channels 206 to a device, known in itself and therefore not shown, for controlling the pneumatic suction which according to the requirements may be rendered operative or inoperative at will, so that the suction disc becomes operative on the blanks in one of the ways hereinafter described, jointly with the rollers 207 and 208 running freely upon its circumference.

The roller pair 202, 203 and the suction disc 204 can be operated at two different speeds, in such a way that their circumferential velocity either coincides with the conveying speed of the conveyor belt pairs 55, 56 or at so high a speed that each foremost blank is individually drawn off completely from the other blanks when it is seized by the roller pair 202, 203 and afterwards the suction disc 204.

To obtain the two different circumferential speeds of the roller pair 202, 203 and the suction disc 204 a gear drive is provided with a displaceable countershaft which is shown in horizontal section in Fig. 2, with the axles of the drive placed in one plane, while in Fig. 1 the gears, for the sake of greater clearness are indicated by dot-and-dash lines. The mechanism is driven from the shaft 209. On this shaft 209 and on the shaft 210 of the belt guidance roller 211 sprocket wheels 212 and 212' are attached and these sprocket wheels are connected with each other by a driving chain 213. The shaft 210 also carries the two spur gears 214 and 215. On the shaft 216 of the suction disc 204 a large spur wheel 217 and a small spur wheel 218 are secured. The intermediate countershaft turns freely on a staybolt 219 and is displaceable in an axial direction. It consists of three spur gears 220, 221 and 222 solidly connected with each other. The spur gear 217 on the shaft 216 of the disc 204 drives—through the medium of an intermediate gear 223—a spur gear 224 attached to the shaft of the roller 202 and in this way the roller itself is driven. This roller through the medium of two additional spur gears not shown drives its counter-roller 203. If, by means of a shifting device which is indicated merely by the fork 225, Fig. 2, the countershaft is so displaced on its stay-bolt 219 that the spur gears 215, 222 and 217 are caused to mesh with each other, the suction disc 204 and the roller pair 202, 203 are driven at the low circumferential speed which corresponds to the speed of movement of the conveyor belts 55, 56. If, however, as assumed in Fig. 2, the spur gears 214, 220, 221 and 218 are in mesh with each other, the suction disc 204 and the roller pair 202, 203 run at the higher speed.

If articles are to be manufactured from blanks on which the two adhesive coatings for auto-adhesion are located on edge surfaces lying in opposite directions of space, such an example being described and shown in the said Patent No. 2,019,946 and in which the same stepped arrangement can be retained for the application of both adhesive coatings, the countershaft of the gear drive is shifted in such a way that the roller pair 202, 203 and the suction disc 204 rotate at the low speed coinciding with that of the conveyor belt pairs 55, 56. In that case the device for controlling the suction air for the suction disc 204 is disconnected, so that the latter serves only as an ordinary conveyor disc co-operating with its counter-rollers 207 and 208. Consequently the stepped blanks passing from the conveyor belt pairs 55, 56 travel on unchanged in the path indicated by a dot-and-dash line through the roller pair 202, 203, as well as between the suction disc 204 and its counter-rollers 207, 208. From here the blanks pass between the roller 226 and its counter-rollers 227 and then between the conveyor belts 230 (guided over the rollers 228 and 229) and their counter-rollers 231, all of which also rotate as fast as the belts 55, 56. The conveyor belts 230 are assisted on their route carrying the stepped blanks by freely running rollers 232. While the blanks are engaged by the conveyor belts 230 a device $K^2$ effects the second adhesive application which lies in the opposite direction of space as compared with the first adhesive coating, this second adhesive application being designated by $g'$ in the prior patent. This adhesive applying device $K^2$ is described in the pending U. S. patent application Serial No. 43,434, filed on October 3, 1935.

From the adhesive applying device $K^2$ the stepped blanks pass under the freely running rollers 233 which also co-operate with the conveyor belts 230. These rollers 233 (the same as the rollers 201 and 207, 208) are adjustable according to the blank sizes and for that purpose are rotatively supported on rails or runners 234 which can be displaced in cross pieces 235. The cross pieces 235 are so arranged on the cross rods 237 extending between the frame parts 236 that the rollers are pressed yieldingly upon the stepped blanks. The rollers 233 are so adjusted that on the one hand they run without contact with the still moist adhesive coating on the stepped blanks and, on the other hand, release each foremost blank as soon as the latter is seized by the conveyor belt pairs 115, 116 now taking it over. This is necessary since these conveyor belt pairs are driven slightly faster than the conveyor belts 230, in order that the stepped blanks are pulled apart a little and that their sticking together is thereby prevented.

Having now described how the stepped blanks whose two adhesive coatings upon their two side surfaces are located in opposite directions of space, and which therefore do not require any restepping prior to the application of the second adhesive coating, are conveyed to the conveyor belt pairs 115, 116 from the conveyor belt pairs 55, 56, and receive the second adhesive coating on this route, a description will now be given of the handling of blanks according to Figs. 3 to 5, in which the two adhesive coatings upon their two side surfaces are located in the same direction of space and which therefore require a restepping in the above-mentioned manner prior to the application of the second adhesive coating.

The stepped blanks of the last-mentioned kind are represented in Fig. 3, when it is looked at with the arrow directed upward, the way it arrives at the conveyor belt pairs 55, 56, looked at from the right at the bottom, at their end rollers 200 and 238. When observed as indicated, the blanks are also conveyed in the direction of the arrow in Figures 3 to 5. In order to restep these blanks in the manner necessary for the second adhesive application $g'''$ according to Fig. 5, the countershaft of the gear drive is so shifted that the gears 214, 220, 221 and 218 are in mesh with each other. This shifting corresponds to that shown in Fig. 2. The roller pair 202, 203 and the suction disc 204 then rotate so fast that the rollers 202, 203 completely pull out from under the other blanks the blank which lies foremost and lowermost according to Fig. 4 when looked at in the direction indicated. The blank is thus fed to the suction disc 204 in such a way that the latter is now able to seize it near the point of its bottom flap $b''$ with the suction openings 205 of one of its sides when the control device for the suction air is connected. It then conveys the blank under the counter-rollers 207 and 208 co-operating with it. The next blank is fed to the suction disc 20 by the roller pair 207, 208 in the same manner and this disc only carrying out one revolution to every two blanks, conveys it with the suction openings 205 on its other side so far under the preceding blank that the edges of both blanks show a distance from each other corresponding to the width of the second adhesive coating $g'''$. In the same manner each succeeding blank is pushed under the preceding one, so that on and behind the suction disc 204 a stepped stack of blanks is formed according to Fig. 5, in which the foremost blank now lies uppermost, again with reference to the optical directions mentioned.

The conveying means comprising the roller 226 with its counter-rollers 227 and the conveyor belts 230 with their counter-rollers 231 and 233 again rotate slowly, at a circumferential speed which corresponds to the conveying speed of the conveyor belt pairs 55, 56. At this conveying speed the stepped stack of blanks is led past the adhesive applying device $K^2$ which in this case produces the second adhesive coating $g'''$ located on the two side flaps $s'$. The rollers 233 in this connection, too, are set in such a way that they do not come into contact with the still moist adhesive coating $g'''$ and that they release each foremost blank when it is seized by the conveyor belt pairs 115, 116.

Both the one and the other kind of blanks, regardless of whether they have to be restepped for the second adhesive application or not, traverses in stepped arrangement the conveyor belt pairs 115, 116 for the purpose of drying the second adhesive coating. From the conveyor belt pairs 115, 116 the blanks, as described in the Patent No. 2,019,946, then pass to the folding and pasting mechanism which delivers the work in finished condition to the stack 174.

In Figs. 6 to 9 the course of manufacture of an envelope made from the blanks of Figs. 3 to 5 is shown. In that case, too, there is effected in the same sequence as in the envelope shown in the said prior patent, and with the same devices, successively the straightening out of the different blanks prior to their delivery to the folding and pasting device, the production of the creases $f'$ and $f''$ for the bottom and closing flap folds, the turning over of the side flaps $s'$, the application of the adhesive $k'$ for the pasting of the bottom flap $b''$, the folding and pasting of the bottom flap $b''$ and finally the turning over of the closing flap $v'$.

Regarding the last-mentioned measure, it is assumed in the example of work of Figs. 6 to 9 that the closing flap $v'$ is provided with two parallel creases $f''$ and $f'''$ located at a small distance from each other. For the storing of the envelopes the closing flap is folded according to the crease $f'''$ as per Fig. 9, that is to say, it is turned over so that the two adhesive coatings $g''$ and $g'''$ do not touch each other. When, on the other hand, after the insertion of the letter or other contents, the envelope is to be sealed, the closing flap is folded according to the closing flap fold $f''$ proper, so that the two adhesive coatings $g''$ and $g'''$ coincide with each other and form a seal.

For producing the additional preliminary break $f'''$, the roller of the folding device which effects the preliminary breaking of the bottom flap $f'$ and the closing flap fold $f''$ proper, can be equipped with a third creasing knife, while the turning over of the closing flap according to the additional preliminary break $f'''$ can take place at once with those tools of the folding device which otherwise turn over the closing flap according to its fold $f''$ proper.

The flap carrying the adhesive coating of the back of the blank in the envelopes described in the said Patent No. 2,019,946 is eliminated in the blanks according to Figs. 6 to 9, as can be seen. The devices for the preliminary breaking of the fold of this flap and for turning it over are therefore put out of commission when manufacturing the last-mentioned articles.

The present invention relates essentially to the application of the adhesive coatings to the edges of the blanks for self-sealing, and although the mechanism for completing the envelopes or bags by pasting and folding in the well-known manner forms no part of this invention as defined in the claims, the process has been described and the apparatus has been described and shown in connection with a complete machine, and Figs. 10 and 11 of the drawings show in diagrammatic form a complete machine of the type disclosed in the prior Patent No. 2,019,946, but with the present improvements embodied therein.

Referring to Figs. 10 and 11, envelope blanks from a stack 2 are individually received by a pair of rolls 6, 7, one above the other and in stepped or overlapping relation. These stepped blanks are taken over by a pair of rolls 8, 9 and are guided thereby to a pair of conveyor belts 12 carried on rolls 10, 11, and coacting with a fixed roll 13 and an adjustable roll 14. The blanks are then grasped and separated from each other in the known manner by the action of the high speed rollers 15, 16 and the separated blanks then pass between rolls 19, 20, then between a platen cylinder 24 and a printing cylinder 25, and between a counter cylinder 30 and suction disc 32, which latter is provided with counter rolls 36. The blanks then pass between rolls 37, 38 by which they are again restored to their stepped or overlapping relation. The blanks then pass in this form to conveyor belts 39, 40 arranged in pairs, the belts 39 being driven from a drum 41 and passing over rolls 42, 43, and 44, while the belts 40 are driven by a drum 45 and pass over rolls 46, 47, 48, 49, and both pairs of belts pass over an arched table in the known manner, while the first coating of adhesive is applied to the exposed edges of the closure flaps by the adhesive-applying device $K'$. From the belts 39, 40 the blanks pass to the pairs of conveyor belts 55, 56. As shown at Fig. 10 the belts 56 pass over rolls 63, 69, 70, while the belts 50 are passed around rolls 62, 61. As shown at Fig. 11, the belts 56 are carried by guide means including rolls 68 and 238, while the belts 55 are guided by means including rolls 58, 59, 60, 66, 200 and drum 57.

From the conveyor belts 55, 56 the blanks are delivered to the mechanism above described in connection with Fig. 1 of the drawings, and after the application of the second adhesive coating from the pivoted adhesive container $K^2$ the blanks are delivered to the conveyor belts 115, 116 and while being conveyed thereby the second adhesive coating is dried. For the drying of the first and second adhesive coatings two drying devices are provided one in association with the belts 55, 56 and the other with the belts 115, 116, and each device comprises a hot air container 74 having outlets 74' through which the air is directed towards the adhesive coatings. The belts 115 pass over the drum 117 and over rolls 118, 119, 120, Fig. 10, and over the rolls 121, 122, 123, 124, and 125, Fig. 11, while the belts 116 pass over the rolls 127, 128, Fig. 10, and over the rolls 126, 129, 130, 132, 132, 133, Fig. 11. From the belts 115, 116 the blanks are delivered to conveyor belts 136 carried on rolls 134, 135, and while being so conveyed the blanks are engaged by rolls 137, and 140. The blanks then pass between rolls 138, 139 and are then received by a roll 141 and its counter roll 142. The blanks then pass between rolls 148, 149, then between rolls 151, 154, to rolls 156, 157, then to a segment 160, and thence to the rolls 164, 165 and by means of the mechanism 169, 171, 172 to the stack 174 as more clearly shown at Fig. 1. Between the belts 136 and the receiving stack 174 the blanks are handled and treated in the known manner to produce the finished articles.

Although the drawings and above specification disclose the best mode in which I have contemplated embodying my invention, I desire to be in no way limited to the details of such disclosure, for in the further practical application of my invention, many changes in constructional details may be made, as circumstances require or experience suggests, without departing from the spirit of the invention within the scope of the appended claims.

What I claim is:

1. Process for the manufacture of envelopes, bags and similar articles having self-sealing flaps, which comprises applying—in a continuous operation—two coatings of adhesive on the two faces of the blanks, feeding the blanks in uninterrupted overlapping stepped form during one application of adhesive, then re-stepping the blanks in reversed form to expose different edges of the blanks, and applying the second adhesive coating after the re-stepping.

2. In a machine for making envelopes, flat bags and the like from shaped blanks, the combination comprising means for conveying the blanks in stepped formation, means for applying adhesive to exposed edges on one side of the blanks while being so conveyed, means for further conveying the blanks after the application of adhesive, means for applying adhesive to exposed edges on the other side of the blanks during said further conveyance, and variable speed transfer means for transferring the blanks from the first to the second conveying means.

3. In a machine for making envelopes, flat bags, and the like from shaped blanks, the combination comprising means for conveying the blanks in stepped formation, means for applying adhesive which adheres to itself when dry to exposed edges on one side of the blanks while being so conveyed, means for further conveying the blanks after the application of adhesive, means for applying adhesive which adheres to itself when dry to exposed edges on the other side of the blanks during said further conveyance, and variable speed suction means for transferring the blanks from the first to the second conveying means.

4. In a machine for making envelopes, flat bags and the like from shaped blanks, the combination comprising means for conveying the blanks in stepped formation, means for applying adhesive to exposed edges on one side of the blanks while being so conveyed, means for further conveying the blanks after the application of adhesive, means for drying the adhesive applied, means for applying adhesive to exposed edges on the other side of the blanks during said further conveyance, and means for transferring the blanks from one conveying means to the other comprising variable speed mechanism and rotary suction members.

5. In a machine for making envelopes, flat bags and the like from shaped blanks, the combination comprising means for conveying the blanks in stepped formation, means for applying adhesive to exposed edges on one side of the blanks while being so conveyed, means for further conveying the blanks after the application of the adhesive, means located between said conveying means for reversing the stepped formation of the blanks, and a second adhesive applying means comprising an adhesive container for the application of adhesive to newly exposed edges on the side flaps of the blanks during said further conveyance, and means for pivotally supporting said adhesive container.

6. In a machine for making envelopes, flat bags and the like from shaped blanks, the combination comprising means for conveying the blanks in stepped formation, means for applying adhesive to exposed edges on one side of the blanks while being so conveyed, means for withdrawing the blanks from each other and for rearranging them in oppositely stepped formation, means for further conveying the blanks, and a second adhesive applying means comprising an adhesive container for delivering the adhesive continuously to newly exposed edges on the side flaps of the rearranged blanks.

7. In a machine for making envelopes, flat bags and the like from shaped blanks, the combination comprising means for conveying the blanks in stepped formation, means for applying adhesive to exposed edges on the portion of the blanks forming the closing flap of the envelope while being so conveyed, means for reversing the stepped formation of the blanks, means for further conveying the blanks after the re-stepping, and a second adhesive applying means comprising an adhesive container engaging and applying adhesive to the edges of the parts of the blanks forming the side flaps of the envelopes during said further conveyance.

8. In a machine for making envelopes, flat bags and the like, the combination comprising means for conveying the blanks in stepped formation, means for applying adhesive to exposed edges on one side of the blanks while being so conveyed, means for drying the adhesive applied, means for further conveying the blanks after the application of adhesive, means for applying adhesive to exposed edges on the other side of the blanks during the said further conveyance, means for drying the adhesive applied to said latter edges, and means for feeding the blanks from one conveying means to the other comprising change speed drive mechanism for delivering the blanks in undisturbed stepped formation for the manufacture of one type of envelopes and in re-stepped formation for another type of envelopes.

9. Apparatus for the manufacture of envelopes, bags and similar articles in which adhesive for self-sealing is applied to both sides of blanks arranged in stepped formation, comprising means for successively withdrawing from their stepped formation individual blanks with adhesive already applied to one side thereof on edges exposed by such stepped formation, a device for receiving and feeding the blanks, a change-speed drive for the said device, means for selectively driving the device at a speed to feed the stepped blanks in uninterrupted stepped formation or to separate and re-step the blanks, means for supplying suction to said device when the blanks are being re-stepped, and means for applying adhesive to the blanks to provide the second adhesive coating after delivery from said suction device.

10. Apparatus for the manufacture of envelopes, bags and similar articles in which adhesive for self-sealing is applied to both sides of blanks arranged in stepped formation comprising variable speed means for receiving the stepped blanks with adhesive already applied to one side thereof, variable speed rotary suction means for conveying the blanks either in uninterrupted stepped formation or selectively in re-stepped formation, means for selectively varying the speed of the said rotary suction means and for controlling the suction thereto, and means for applying adhesive to exposed edges on the stepped blanks received from said suction means, the blanks being continuously fed in a constant direction during the re-stepping operation.

MAX DÜNNEBIER.